United States Patent [19]

Benschoter

[11] 4,020,585

[45] May 3, 1977

[54] ANIMAL TRAPPING APPARATUS

[76] Inventor: Melvin D. Benschoter, Birch Creek Forest, Rt. No. 1, Somerville, Tex. 77879

[22] Filed: July 23, 1976

[21] Appl. No.: 708,040

Related U.S. Application Data

[63] Continuation of Ser. No. 571,603, April 25, 1975, abandoned.

[52] U.S. Cl. .................................................. 43/96

[51] Int. Cl.[2] ...................................... A01M 23/24

[56] References Cited

UNITED STATES PATENTS

| | | | |
|---|---|---|---|
| 468,278 | 2/1892 | Sherwood | 242/107.5 |
| 511,655 | 12/1893 | Small et al. | 242/107.5 |
| 1,119,962 | 12/1914 | Horr | 43/96 |
| 1,540,640 | 6/1925 | Lewis | 43/87 |
| 2,081,379 | 5/1937 | Madsen | 43/87 |
| 2,224,474 | 12/1940 | Draggoo | 43/87 |
| 2,545,385 | 3/1951 | Reppert et al. | 43/15 |
| 2,711,865 | 6/1955 | Ruterbories | 242/84.3 |

*Primary Examiner*—Warner H. Camp
*Attorney, Agent, or Firm*—W. Preston Hickey

[57] ABSTRACT

The trapping apparatus has a tether coiled around a hub in a housing. The hub is biased to foreshorten the tether, by a spirally coiled spring that is positioned to one side of the hub portion on which the tether is wound. The spring is contained within a hoop that may be a portion of the hub to aid assembly. A latch mechanism is provided to release the hub when a caught animal tugs on the tether. The latch mechanism is such that it will not latch again until the tether is completely retrieved.

3 Claims, 3 Drawing Figures

ANIMAL TRAPPING APPARATUS

This is a continuation, of application Ser. No. 571,603, filed Apr. 25, 1975 and now abandoned.

BACKGROUND OF THE INVENTION

The invention relates to animal trapping apparatus, and more particularly to tethered jaw trap. Jaw traps comprise a pair of inverted generally U-shaped jaws which have their ends hinged adjacent each other, so that the side of one jaw will engage the side of the other jaw when they are biased together. Suitable spring means are provided for biasing the two jaws together, and when this spring is compressed, the jaws are folded out into opposite hand positions to form the set condition of the trap. An animal actuated trip device is placed between the spread jaws, which device constrains the spring until it is tripped by the leg of an animal. Thereafter the jaws close toward each other with the leg therebetween to trap the animal.

A sizable percentage of animals that are so trapped, will after a period of time, free themselves by chewing off the trapped leg. The animals do not chew off their leg immediately after being trapped, and will usually only do so after a prolonged period of tugging on the trap in an attempt to pull their leg free from the jaws of the trap.

An object of the present invention is the provision of new and improved means for automatically killing the animal immdiately after it has become trapped.

A still further object of the present invention is the utilization of the tugging action which the animals provide immediately after being trapped for actuating the mechanism which automatically kills the animal.

Further objects and advantages of the invention will become apparent to those skilled in the art to which the invention relates from the following description of the preferred embodiments described with reference to the accompanying drawings forming a part of this specification.

DESCRIPTION OF THE PREFERRED EMBODIMENTS

Substantially all valuable fur-bearing animals which are trapped, frequent water holes for their sustenance, and many of the animals that are trapped have runways or dens either at or below the water level. It is the usual condition for bodies of water to increase in depth outwardly from the water's edge, and according to principles of the present invention it is desired to provide mechanism which will utilize an animal's tugging action which it provides immediately after being trapped to actuate mechanism which will pull the animal out into the deeper water where it will drown. In order that this can be accomplished, the trap must be moved an appreciable distance, and the motor must provide an appreciable pulling force throughout the total distance moved.

Figure 1:
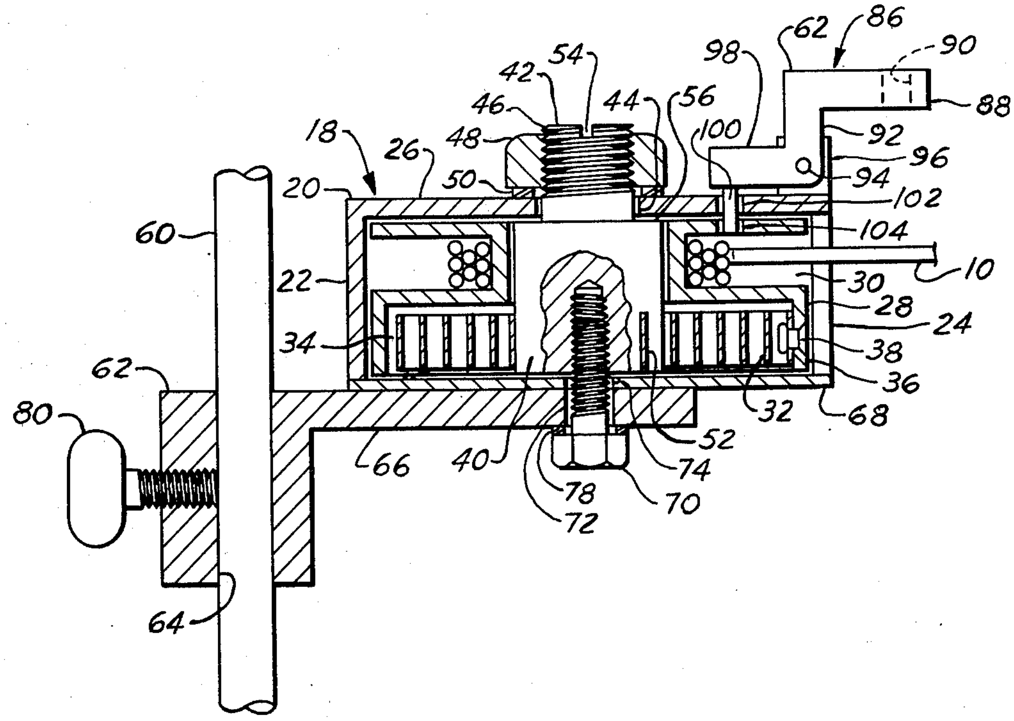
FIG. 1 is a sectional view of a first embodiment of the invention.

The embodiment shown in FIG. 1 for accomplishing the objectives of the present invention generally comprises a length of coilable tether 10, as for example, cable or tape, having a fastener 12 on its free end for attachment to the jaw trap, and which is fixed to a retrieving motor on the other end. Jaw traps usually have a short length of chain 14 affixed thereto with the end of the chain being received in a ring 16 through which stakes are driven into the ground to tether the trap. The fastener previously referred to will usually be snapped onto this ring to utilize the length of chain which is normally provided on the trap. The retrieving motor 18 is shown, as having generally cylindrical sidewalls 22 with a longitudinally extending opening (axially extending) therein, and having a closed upper end 26. A hub (spool) 28 having a groove 30 in its outer periphery is rotatably journaled within the cylindrical housing. The tether 10 extends through the opening 24 with its end being suitably fastened to the bottom of the groove 30. Upon rotation of the hub 28, the tether is coiled within the groove 30 to foreshorten the tether 10 and pull the trap out of the shallow water.

The preferred embodiments of the present invention utilize a spirally coiled spring 32 to provide the motive force for retrieving the tether, with one end of the spirally wound spring being fastened to the hub 28 and the other end of the spring being suitably fixed to the housing. This is accomplished in the embodiment shown in FIG. 1 by providing the hub 28 with a spring chamber 34, that is positioned to one side of and which is separate from, the groove 30 into which the tether is wound. The radially outer edge of the spring chamber 34 is formed by a cylindrical hoop 36, which in the embodiment shown in FIG. 1, is formed integrally and is part of, the hub 28, and which is in line with the radially outer edge of the hub 28. The radially outer edge of the spirally coiled spring 32 is fixed to the cylindrical hoop 36 by suitable means, as for example, the rivet 38, and the other end of the spirally coiled spring 32 is secured to the housing by means of a stub shaft 40. In the embodiment shown in FIG. 1, the stub shaft 40 is locked to the housing by means of a reduced diameter end portion 42 which extends up through an opening 44 in the closed end of the housing 20. The end of the reduced diameter portion 42 is provided with threads 46 which receive a hold-down nut 48, and a lock washer 50 is positioned between the upper closed end 26 of the housing and the hold-down nut 48. The inner end of the spirally coiled spring 32 is received in a cross slot 52 which extends across a minor diameter of the other (lower) end of the stub shaft 40. The upper threaded end 46 of the stub shaft is provided with a screw driver slot 54 which can be used to tension the spring 32 after its end is confined in the cross slot 52 and following which the hold-down nut 48 is tightened to clamp the shoulder 56 that is formed by the reduced diameter portion 42 against the upper closed end 26 of the housing.

Before the spring 32 is tensioned and the stub shaft 40 is locked in place by the tightening of the hold-down nut 48, the tether is completely retrieved by coiling in the groove 30 and the spring 32 is additionally tensioned by the rotation of the stub shaft 40, so that a pulling action will be provided on the tether when the snap fastener 12 is against the housing of the motor. In the embodiment shown in FIG. 1, the motor is supported from a rod 60, that is driven into the ground at a desired location, by means of a generally L-shaped bracket 62, the short vertical leg of which has an opening 64 therethrough for receiving the rod. The L-shaped bracket 62 also has a horizontal leg 66 which extends crosswise underneath the motor. A disc-shaped cover 68 is provided on the bottom end of the housing 20 to close off the spring chamber 34 and retain the spring, and a machine screw 70 is provided to both hold the cover 68 in place and attach the retrieving motor to the horizontal leg 66. Holes 72 and 74 are provided in the horizontal leg 66 and cover 68 respectively, and the machine screw 70 extends therethrough and is threaded into an axially extending tapped hole in the bottom end of the stub shaft 40. A lock washer 78 is used to retain the machine screw 70, and a thumb screw 80 is used to prevent sliding of the L-shaped bracket along the rod 60. In some instances, the hub 28 may be journaled from the housing 20 by means of the outer periphery of the hub, but in the embodiment shown in FIG. 1 it is journaled upon the stub shaft 40 to reduce friction and minimize binding.

Figure 2:
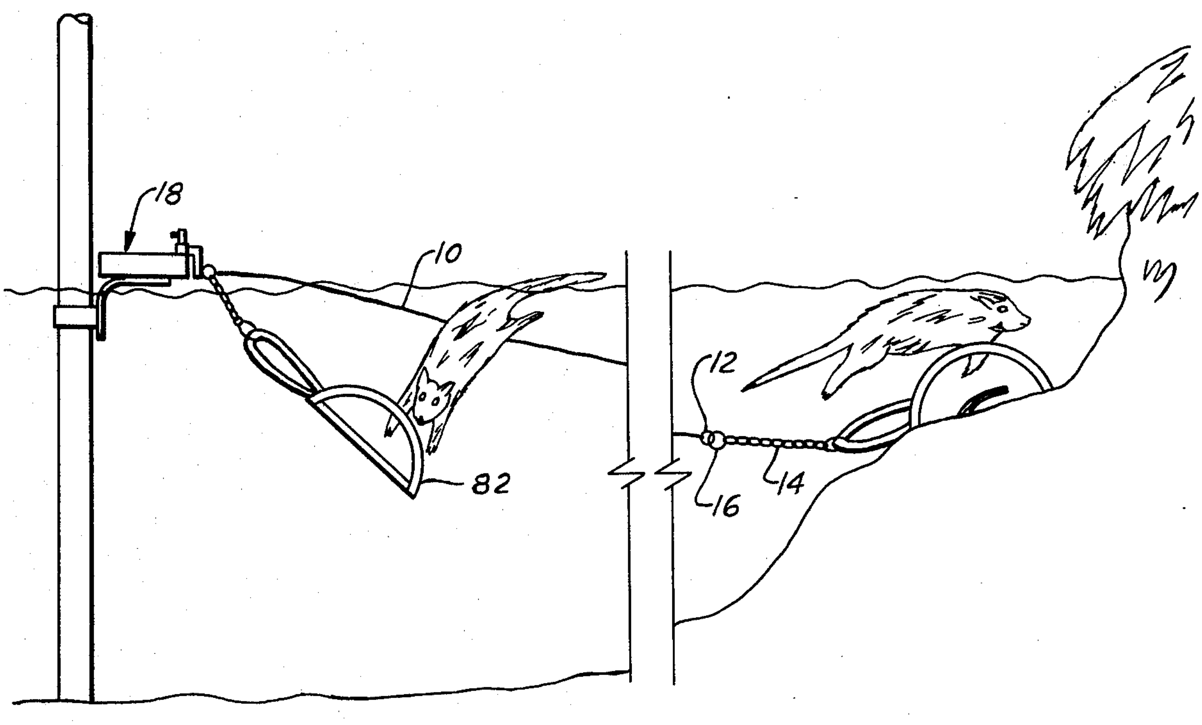
FIG. 2 illustrates the operation of the invention.

A picture is worth a thousand words, and the manner in which the device above described is to be utilized can best be understood by referring to FIG. 2 of the drawings. The jaw trap 82 is placed in shallow water adjacent a den or run, and the rod 60 is placed out in deeper water at a considerable distance from the jaw trap. The tether 10 is pulled out of the retrieving motor 18, and the snap fastener 12 is hooked onto the ring 16 at the end of the chain 14 of the jaw trap that is usually provided on a jaw trap. The tether is pulled to its fully extended condition at the time that the jaw trap is set, and the retrieving motor 18 is restrained by the engagement of the latch structure 86 which will now be described.

The latch structure 86 shown in the preferred embodiment is provided with an actuation leg or portion 88. Suitable means, as for example, the hole 90 is provided on the actuating leg to slidably receive the tether 10. The latch mechanism 86 is so constructed that the actuating leg 88 is positioned to the side of and above the opening 24 in the housing in the latched condition of the retrieving motor 18. The tugging action of the animal is transmitted through the tether to the actuating leg 88 and is utilized to pull the actuating leg 88 downwardly into alignment with the opening 24, in which position the retrieving motor becomes unlatched. The latching mechanism shown has a downwardly extending leg 92 the lower end of which is suitably pivoted to the housing 20 by means of a cross pin 94 that is received in a pair of upstanding ears 96 on the housing. The latch structure 86 is also provided with another horizontal leg 98 that is generally opposite the cross pin 94, and which extends over the upper end of the housing. The leg 98 is provided with a latch pin 100 which extends through an opening 102 in the closed end 26 of the housing into another opening 104 in the side of the hub 28. It will be seen that a tug on the actuating leg 88 will rock the latched mechanism to pull the latch pin 100 out of the opening 104 in the hub to allow the force of the spiral spring 32 to rotate the hub 28 and retrieve the tether 10 until the ring 16 of the jaw trap engages the latch mechanism as shown in FIG. 2. In the retrieved condition of the trap shown in FIG. 2, the trap will be unsupported by the bottom of the body of water, and the weight of the trap will hold the animal beneath the surface until it drowns.

In order that the spirally coiled spring 32 can provide tension throughout the length of travel that is required to achieve the objects of the present invention, the spirally coiled spring in its "as formed" or relaxed condition, will have an outside diameter that is considerably larger than that of the housing 20. It is a difficult task to coil the spring 20 about the stub shaft 40 to a degree enabling it to enter the housing 20 during the assembly of the motor. According to another aspect of the present invention, this task is greatly simplified by providing a hoop 36 into which the spring 34 is coiled prior to the assembly of the retrieving motor. The spirally coiled spring is coiled about its inner end and confined in the hoop 36 before assembly. During assembly the confined spring is merely slid endwise into the motor with its inner end passing into the cross slot 52, so that it is not necessary to tension the spring during assembly. The hoop 36 can be positioned against the machine which coils the spring initially, and the newly formed spring 32 slid off into the hoop 36 to thereafter retain the spring in its coiled condition. In the embodiment shown in FIG. 1, the hoop is an integral part of the hub 28 to provide a subassembly containing all coiled materials which can be slid into position with the tether 10 passing down the opening 24. The assembly is then completed by the addition of the cover 68 which both closes off the housing 20 and the spring chamber 34 in a single operation.

Figure 3:
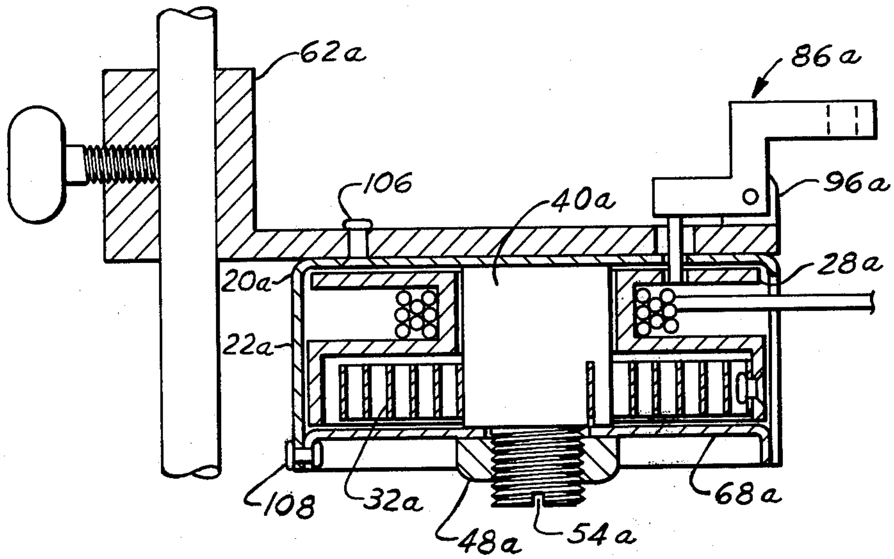
FIG. 3 is a sectional view of a second embodiment of the invention.

The embodiment shown in FIG. 3 is a somewhat simplified construction wherein the ears 96 and the L-shaped bracket 62 can be made as a single casting. In addition, the cylindrical housing 20 is a simple cup that can be made as a sheet metal stamping. Those portions of the embodiment shown in FIG. 3 which are similar to portions of the embodiment shown in FIG. 1 are designated by a like reference numeral characterized further in that a suffix *a* is affixed thereto. In the embodiment shown in FIG. 3, the reduced diameter portion of the stub shaft 40*a* extends downwardly through a hole in the cover 68*a* and is used to lock the stub shaft to the cover. The hub 28*a* and spring 32*a* can, therefore, be assembled on the stub shaft and cover before being placed into the housing 20*a*. Prior thereto, the L-shaped bracket 62*a* will have been secured to the housing 20*a* by some suitable means as by the rivets 106. After assembly, the cover 68*a* is fastened to the housing 20*a* by the fasteners 108. The spring 32*a* can be suitably tensioned using the screw driver slot 54*a* before tightening the hold-down nut 48*a*.

It will now be seen that the objects of the present invention have been accomplished and that there has been provided new and improved trapping apparatus which will humanely kill the trapped animal within a few minutes after it becomes caught in the trap. While these objectives can be achieved using other types of retrieving motors, the retrieving is accomplished in the preferred embodiments by a spring motor which can be assembled and disassembled for cleaning, etc. with the spring in a caged condition. In some instances, other types of latch mechanism may be utilized provided they also utilize the pulling action of the animal to unlatch the retrieving motor in a manner which causes the motor to completely retrieve the tether without stopping, once the latch has been released by the tugging action of the caught animal.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates.

I claim:

1. An inexpensive, humanitarian trapping system comprising:

a jaw trap assembly including animal actuating means therefor, a spring motor housing having an annular chamber therein, a generally centrally located stub shaft in said chamber, said stub shaft having a longitudinally extending slot in its outer surface and communicating with the end of said stub shaft, an annular spool slidable endwise over said stub shaft into said chamber, a stiff coil spring strong enough to pull said jaw trap with an animal therein along the bottom of a body of water, said spring having a generally radially bent inner end for sliding endwise into said slot in said stub shaft, means for fastening the outer end of said spring to said annular spool, a tether coiled around said spool, said housing having a tether opening through which said tether uncoils generally tangentially, latch means for restraining the recoil of said spool, said latch means having a portion that is positioned generally to one side of said opening in said housing when latching said spool against recoil and being generally over said opening when unlatching said spool, said tether being slidably retained by said latch portion and being connected to said jaw trap, and whereby said stiff coil spring can be slid axially into its assembled position and an animal that is caught in said jaw trap and who pulls on said tether to unlatch said spool can be dragged from shallow water to deeper water and automatically drowned by the weight of the jaw trap.

2. The trapping system of claim 1 wherein said stub shaft extends across the full width of said housing, and said spool has a peripheral hoop adjacent one side thereof within which said spring is confined, and a tether groove in the periphery of said spool adjacent the opposite side thereof, said spool having an uninterrupted bearing surface beneath said tether groove and journaled on said stub shaft.

3. An inexpensive, strong and reliable tether system for pulling a jaw trap with an animal caught therein along the bottom of a body of water, said tether system comprising:

a spring motor housing having an annular chamber therein, a generally centrally located stub shaft in said chamber, said stub shaft having a longitudinally extending slot in its outer surface and communicating with the end of said stub shaft, an annular spool slidable endwise over said stub shaft into said chamber, a stiff coil spring strong enough to drag a jaw trap with an animal therein along the bottom of a body of water, said spring having a generally radially bent inner end for sliding endwise into said slot in said stub shaft, said spool having a hoop adjacent one side thereof to which the outer end of said coil spring is secured, said spool also having a groove in its periphery adjacent the opposite side thereof, a tether coiled around said spool in said groove, said housing having a tether opening through which said tether uncoils generally tangentially, latch means for restraining the recoil of said spool, said latch means having a portion that is positioned generally to one side of said tether opening in said housing when latching said spool against recoil and being generally over said opening when unlatching said spool, said tether being slidably retained by said latch portion, and whereby said stiff coil spring can be installed into said housing by sliding endwise over said stub shaft with said radially bent portion sliding into said groove to produce an inexpensive tether system for drowning an animal caught in a jaw trap connected to the tether.

* * * * *